United States Patent [19]

Lambeth

[11] 4,413,892
[45] Nov. 8, 1983

[54] MAGNETOSTRICTIVE POSITION SENSING DEVICE AND PHOTOGRAPHIC APPARATUS INCORPORATING SUCH DEVICE

[75] Inventor: David N. Lambeth, Webster, N.Y.

[73] Assignee: Eastman Kodak Company, Rochester, N.Y.

[21] Appl. No.: 364,833

[22] Filed: Apr. 2, 1982

[51] Int. Cl.³ .................. G03B 17/00; G01B 7/14
[52] U.S. Cl. .................... 354/21; 354/202; 354/230; 354/266; 324/208; 73/DIG. 2
[58] Field of Search ........... 354/195, 198, 202, 230, 354/289, 354, 21; 367/117, 118, 124, 126, 127, 129, 106, 130; 179/110 C; 333/148; 324/208, 244, 249; 73/597, 641, DIG. 2; 352/78 C

[56] References Cited

U.S. PATENT DOCUMENTS

| | | | |
|---|---|---|---|
| 3,503,680 | 3/1970 | Schenkerman | 367/95 X |
| 3,522,764 | 8/1970 | Biber | 354/195 |
| 3,836,920 | 9/1974 | Ochiyama et al. | 354/27 |
| 3,846,580 | 11/1974 | Brenner | 178/19 |
| 3,898,555 | 8/1975 | Tellerman | 324/23 D |
| 3,904,821 | 9/1975 | Whetstone | 178/19 |
| 3,917,395 | 11/1975 | Ogawa | 354/23 D |
| 3,956,588 | 5/1976 | Whetstone et al. | 178/19 |
| 4,018,989 | 4/1977 | Snyder et al. | 178/18 |
| 4,035,762 | 7/1977 | Chamuel | 340/16 R |
| 4,051,489 | 9/1977 | Saito et al. | 354/23 D |
| 4,079,386 | 3/1978 | Murakami et al. | 354/23 D |
| 4,081,603 | 3/1978 | Davis et al. | 178/19 |
| 4,103,307 | 7/1978 | Shinoda et al. | 354/23 D |
| 4,144,519 | 3/1979 | Chamuel | 340/16 R |
| 4,238,844 | 12/1980 | Ueda et al. | 324/208 X |
| 4,319,189 | 3/1982 | Cullum, Jr. et al. | 324/208 |

OTHER PUBLICATIONS

New Product Bulletin-Temposonics Incorporated.
Product Data Sheet; I.D. The Intelligent Digitizer, Summagraphics Corp.
Presentation by A. L. Whetstone, "A New Data Tablet Digitizer using Magnetostriction", Scriptographic Corp.

*Primary Examiner*—William B. Perkey
*Attorney, Agent, or Firm*—Thomas H. Close

[57] ABSTRACT

Position sensing mechanism, particularly for photographic apparatus controlled by a digital computer, includes a magnetostrictive position sensing device for supplying information on the positions of movable parts of the apparatus to the computer. The magnetostrictive position sensing device comprises a magnetostrictive element, such as a wire, a first electromagnetic transducer disposed with respect to the magnetostrictive element for transducing an acoustic pulse therein, and a second electromagnetic transducer disposed with respect to the magnetostrictive element for transducing the acoustic pulse, the first and second transducers being constructed for relative movement and a timer for measuring the propagation time of the acoustic pulse between the transducers. The measured time represents the relative position of the transducers along the magnetostrictive element.

7 Claims, 23 Drawing Figures

4,413,892

MAGNETOSTRICTIVE POSITION SENSING DEVICE AND PHOTOGRAPHIC APPARATUS INCORPORATING SUCH DEVICE

BACKGROUND OF THE INVENTION

1. Field of the Invention

The present invention relates to magnetostrictive position sensing apparatus, and more particularly to the use of such apparatus to sense the position of movable parts in digitally controlled apparatus such as photographic apparatus.

2. Description of the Problem

Many modern photographic cameras are highly automated, including automatic features such as exposure control, focus, flash operation, film advance, etc. Increasingly, as the cost of integrated circuitry declines, the method of choice for controlling such highly automated photographic cameras is the use of digital logic. U.S. Pat. No. 4,103,307 issued July 25, 1978 to Shimoda et al, represents an example of a single lens reflex camera with automatic exposure control, that is controlled by a digital computer.

One of the most difficult problems faced in the design of such a camera is how to get information regarding the positions of various camera parts such as the lens, shutter, aperture, or reflex mirror, and the positions of numerous operator controlled knobs, buttons and dials into the computer.

In the past, prior to the widespread use of digital circuitry, potentiometers were widely employed as transducers for indicating to the camera control circuitry the position of moving parts. Switches were also employed when a binary (on or off) type indication was needed. See for example, U.S. Pat. No. 3,836,920 issued Sept. 17, 1974 to Uchiyama et al.

A problem was encountered, however, with the use of potentiometers as position transducers for digital control circuitry. The analog voltage generated by the potentiometers needs to be converted to a digital value by an analog-to-digital converter before the information is useful to the digital computer. The required analog-to-digital conversion circuitry is costly and complicated. Another problem encountered with potentiometers employed as position transducers is their susceptibility to noise, as dirt accumulates between the sliding contacts and the resistive element of the potentiometer. Various forms of transducers using a plurality of contacts were proposed as a cure for these problems. See for example U.S. Pat. No. 4,079,386 issued Mar. 14, 1978 to Murakami et al, wherein a position sensor including a pulse generator comprising a comb-shaped conductive pattern, and a moving brush adapted to sequentially engage the teeth of the comb as the brush is displaced, is described. The position of the brush is deduced by starting from a known location and counting the pulses produced as the brush sweeps successive teeth of the comb. Such comb-shaped transducers require few input wires to the digital computer, but the position information provided thereby is volatile, i.e. the position information is lost if the computer is shut down and the sensor is not returned to its starting position.

Others have proposed to solve the transducer problem by the use of position encoders comprising a plurality of shaped conductive tracks and brushes, see for example FIG. 3a of U.S. Pat No. 4,051,489 issued Sept. 27, 1977 to Saito et al. The encoder-type transducers provide a non-volatile indication of position, but at the cost of many input leads to the microprocessor, one for each encoder track. If several encoders are employed in a camera to provide position information for several moving parts, the number of separate leads within the camera becomes considerable. All position transducers employing movable contacts share the problems of contact bounce producing spurious signals, and dirt or corrosion of the contacts causing noise. To overcome the corrosion problem, expensive gold-plated contacts have been used. Furthermore, the precision of the encoder-type position sensors is determined by the fineness of the encoder patterns, thereby increasing the cost and reducing the reliability of position transducers capable of highly accurate position measurements.

The challenge faced by the inventor therefore was to provide a position transducer for a digitally controlled photographic apparatus, such as a camera, that avoids the problems noted above. Required was a transducer that is inexpensive, relatively simple, low noise, nonvolatile, employing only a few leads for indicating a range of positions, and being capable of precision measurements which are not an inherent function of the complexity of the transducer.

SUMMARY OF THE INVENTION

The apparently conflicting requirements outlined above are met and the problems discussed above are solved according to the present invention by providing a position sensing device in digitally controlled apparatus, for example, photographic apparatus, such as a camera, comprising a magnetostrictive element, such as a wire, a first electromagnetic transducer disposed with respect to the magnetostrictive element for transducing an acoustic pulse therein, and a second magnetic transducer disposed with respect to the element for transducing the acoustic pulse, the first and second transducing elements being, constructed for relative movement along the magnetostrictive element, and a timer for measuring the propagation time of the acoustic pulse between the first and second transducers. The timer, comprising digital circuitry is easily interfaced to a digital control computer. Thus a position transducer without electrical contacts and the attendant problems of contact bounce, corrosion and noise, is provided which is specially suited for use with digitally controlled photographic apparatus such as a camera.

According to one feature of the invention, the magnetostrictive position sensing device is capable of measuring the positions of a plurality of movable parts using a single magnetostrictive element. The magnetostrictive element (e.g., a wire) is serpentined through the apparatus past a plurality of movable electromagnetic transducers. Means are provided for measuring the time of propagation of an acoustic pulse between a selected pair of the transducers.

According to another feature of the invention, the accuracy of measurement of the magnetostrictive position sensing device is increased by a technique of averaging successive measurements. An acoustic pulse is launched in the magnetostrictive element by a first electromagnetic transducer, and upon being sensed by a second electromagnetic transducer, another acoustic pulse is launched. This process is repeated until N pulses have been launched and sensed. The time elapsed between the launch of the first acoustic pulse to the sensing of the Nth acoustic pulse is measured and the elapsed time is divided by N to yield an elapsed time accurate to a fraction 1/N of a period of the clock used in the timer.

BRIEF DESCRIPTION OF THE DRAWINGS

The invention will be described in detail with respect to the accompanying drawings, wherein.

DESCRIPTION OF THE PREFERRED EMBODIMENTS

Photographic apparatus being well known in the art, only those parts relating directly to the present invention will be described in detail, the rest being selectable from those in the art.

Figure 1:
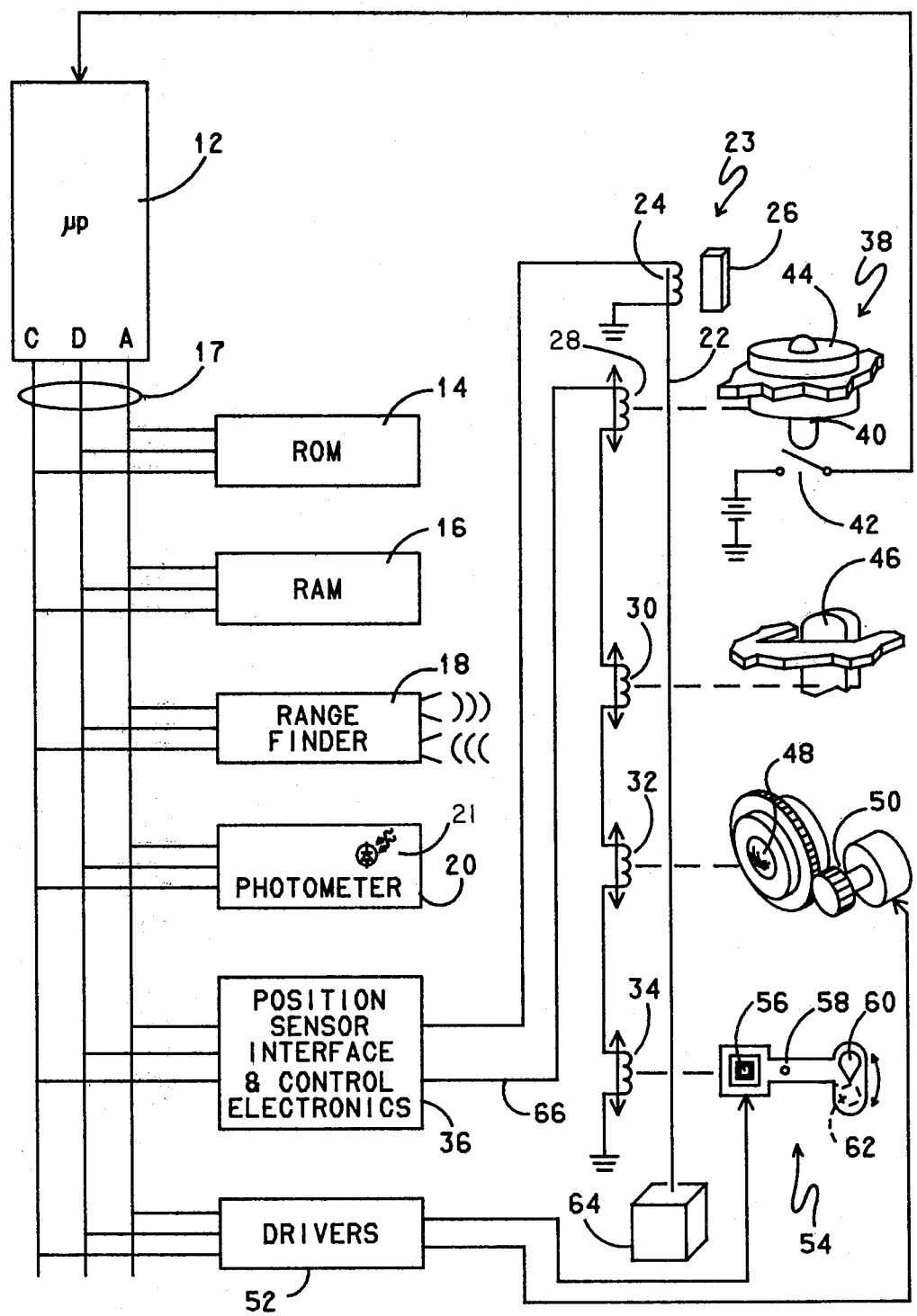
FIG. 1 is a schematic diagram showing a microprocessor controlled photographic apparatus with a magnetostrictive position sensing device according to the present invention.

FIG. 1 is an overall schematic diagram showing a magnetostrictive position sensing device in digitally controlled photographic apparatus, such as a camera, according to the present invention. The camera control system comprises a programmed microprocessor 12, some permanent read-only memory (ROM) 14, containing the program, and some temporary random access memory (RAM) 16. Such a control system can be purchased in the form of a single component microcomputer such as the Intel Model 8048 single chip microcomputer. The control system is connected to camera elements by means of a bus 17. including control lines C, data lines D, and address lines A. The camera includes a range finder 18 connected to the computer bus. The specific details of the range finder 18 are not shown since this element does not comprise a part of the present invention. Several of the presently known automatic range finding devices are suitable for use herein. See for example, the sonic range finding device disclosed in U.S. Pat. No. 3,522,764 entitled "Range Finding and Focusing System for Photographic Cameras and the Like", by C. H. Biber, granted Aug. 4, 1970; or the solid state range finding device disclosed in U.S. Pat. No. 3,945,023 entitled "Autofocus Camera with Solid State Range Finder", by N. L. Stauffer, granted Mar. 16, 1976. The range finding device, when signaled by the computer 12, determines the range to the main subject, i.e., that subject which is in a principle part of the picture, preferably designated by fiducial marks in the camera view-finder. The range finding device generates a signal indicative of the distance to the main subject, and the signal is converted to a digital signal for transmittal to the microcomputer on the bus 17.

The camera also contains a photometer 20 connected to microcomputer 12. The photometer includes a photosensitive element 21, such as a silicon photodiode, and suitable signal processing electronics for generating a signal proportional to the brightness of the main subject. The specific details of the light sensitive circuit are not shown, since the circuit does not constitute part of the present invention. Any number of light sensitive circuits employed in automatic exposure control systems are suitable for use herein, the only requirement being that the output signal represent the brightness of a main portion of the scene. This scene brightness signal is converted to a digital signal suitable for use by the microcomputer and is supplied in digital form to the computer on the bus 17 in a known manner.

The magnetostrictie position sensing device according to the present invention comprises a magnetostrictive element such as a wire of magnetostrictive material 22. First electromagnetic transducer means for launching an acoustic pulse in magnetostrictive element 22, including for example a coil 24 and a bias magnet 26, is located in a relatively fixed position with respect to the wire 22.

A plurality of relatively movable electromagnetic transducer means 28, 30, 32, and 34 for detecting the acoustic pulse in magnetostrictive element 22, comprising movable coils, connected in series are arranged for sensing the acoustic pulse in the wire. A position sensor interface and control electronics circuit 36 connected to relatively fixed electromagnetic transducer means 23 and relatively movable transducer means 28, 30, 32 and 34 includes timing means for measuring the elapsed time between the launch of an acoustic pulse by transducer 23 and the sensing thereof by one of the transducers 28, 30, 32 and 34. The position sensor interface and control electronics 36 is connected to the microprocessor by the bus 17. The elapsed time measured by the timing means represents the distance between the pulse sending transducer 23 and one of the pulse sensing transducers 28, 30, 32 and 34.

Four movable camera elements are connected to the four relatively movable sensing coils 28, 30, 32 and 34. A body release button generally designated 38 includes an internal portion 40 adapted to engage and close a main power switch 42, and an external portion 44 mechanically coupled to the first sensing coil 28. A cartridge notch sensor includes a movable sensor member 46 that is mechanically connected to the second sensing coil 30. An automatic focus mechanism includes an adjustable lens element 48 driven by a motor 50. The lens element 48 is mechanically coupled to sensing coil 32. Motor 50 is controlled by the microprocessor 12 through current drivers 52. A shutter/aperture mechanism generally designated 54 is powered by an electromagnetic actuator including a coil 56 supplied with current by drivers 52 under control of microprocessor 12. The shutter/aperture mechanism pivots about a pivot point 58 and includes a shaped aperture 60 movable with respect to a fixed aperture 62. Shutter/aperture mechanism 54 is mechanically coupled to sensing coil 34 to provide position feedback information regarding the position of shaped aperture 60 with respect to fixed aperture 62. At the end of magnetostrictive wire 22 is an acoustic damper 64 for surpressing reflections of the acoustic pulse from the end of the wire.

In operation, when an acoustic pulse is launched by sending transducer 23, the pulse is sensed consecutively by sensors 28, 30, 32, and 34, each sensor producing a signal pulse on line 66. By arranging the plurality of sensing coils in series, a minimum of lines are required to service the plurality of sensors in the camera.

Figure 2:
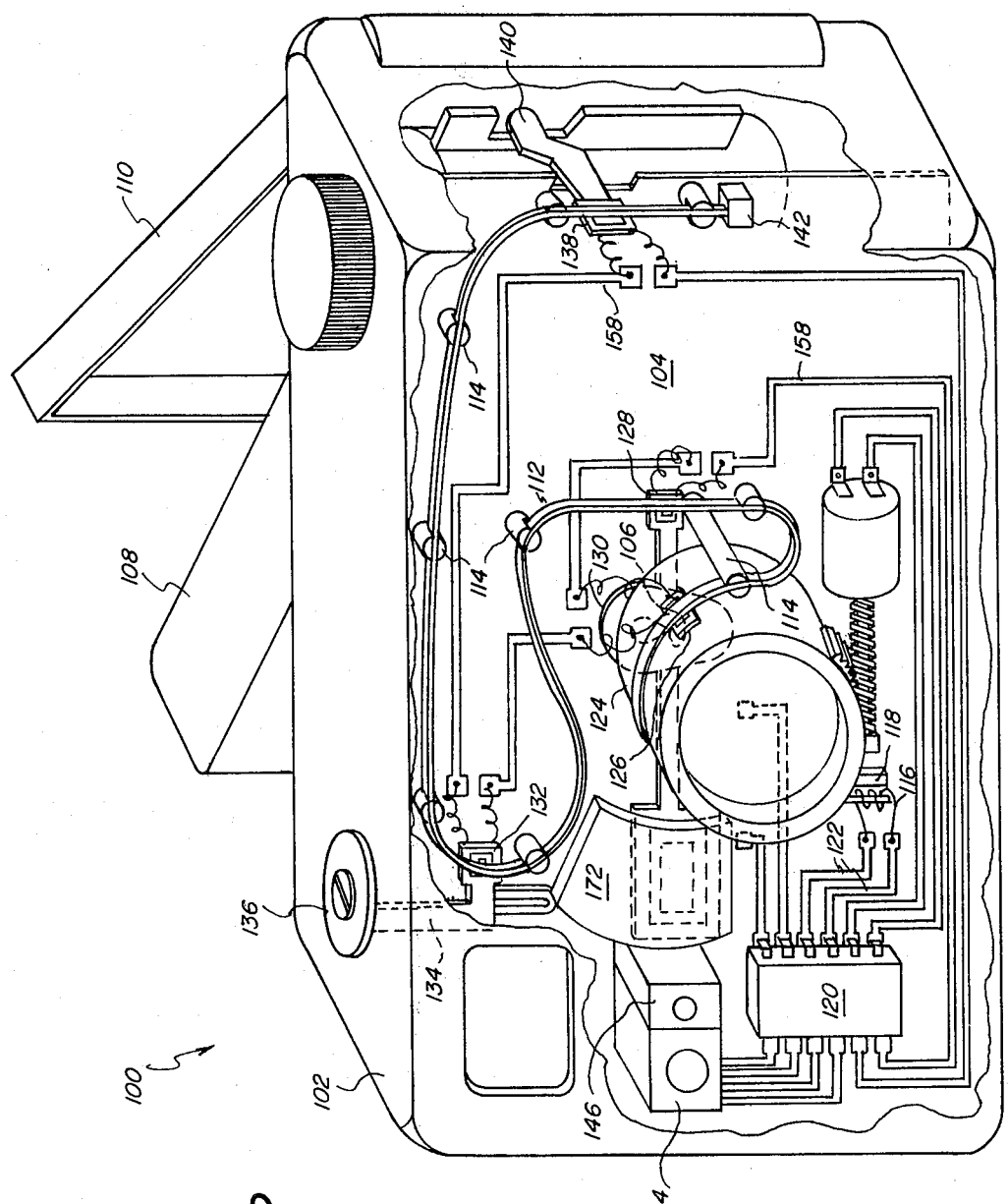
FIG. 2 is a perspective view of a microprocessor controlled photographic camera partially broken away to reveal a magnetostrictive position sensing device according to a preferred embodiment of the present invention, including a lens focus position sensor, an aperture/shutter position sensor, a body release position sensor, and a cartridge notch sensor.

In actual practice, the magnetostrictive wire is serpentined around the inside of the camera to reach the various position sensing locations. Turning now to FIG. 2, a camera incorporating the magnetostrictive position sensing device according to the present invention is shown. The camera generally designated 100, includes a camera body 102, partially broken away to reveal the elements inside. The camera elements are mounted on a mechanism plate 104 of mild steel coated with an insulating enamel. The mechanism plate 104 carries the camera components and the magnetostrictive position sensor and forms an aperture 106 through which light passes to expose the photographic film contained in a film cartridge 108. The back of the camera 110 hinges open to receive the film cartridge 108.

A magnetostrictive wire 112, supported on standoffs 114 from mechanism plate 104, is serpentined through the camera past various moving parts. The magnetostrictive wire was obtained from the William B. Driver Company, Orangeburg, S.C. 29115, under the trademark Remendur ® 27, having a rectangular cross section about 4×20 mils. The wire is routed through the camera in smooth arcs to avoid any sharp bends which would cause undesirable reflections of an acoustic pulse transmitted through the wire. During manufacture, the wire is held in the shape it will take in the camera, and then annealed to remove its springy nature. The standoffs are preferably plastic pins with slots in the top to receive the wire. The standoffs are not significantly acoustically coupled to the wire so they do not substantially absorb or reflect any acoustic pulse transmitted through the wire.

The wire starts at the sending transducer comprising coil 116 and bias magnet 118 which is connected to an electronics package 120. The electronics package contains the microcomputer, control electronics, and drivers employed in the camera. Connections are made to the electronics package via printed conductors 122 formed on the enamel coating of mechanism plate 104 using conductive inks and well known screen printing techniques. The magnetostrictive wire 112 supported by standoffs 114, winds part-way around lens barrel 124 past sensor coil 126. The wire continues past a sensor coil 128 carried by a shutter aperture blade 130, past a sensor coil 132 carried by an extension 134 of a body release member 136, and finally past a sensing coil 138 carried by a cartridge notch sensing lever 140. The magnetostrictive wire 112 is terminated in an acoustic damping medium 142, such as modeling clay. The transducer portions 144 and 146 of a range finder and a photometer respectively, are connected to electronics package 120.

Figure 3:
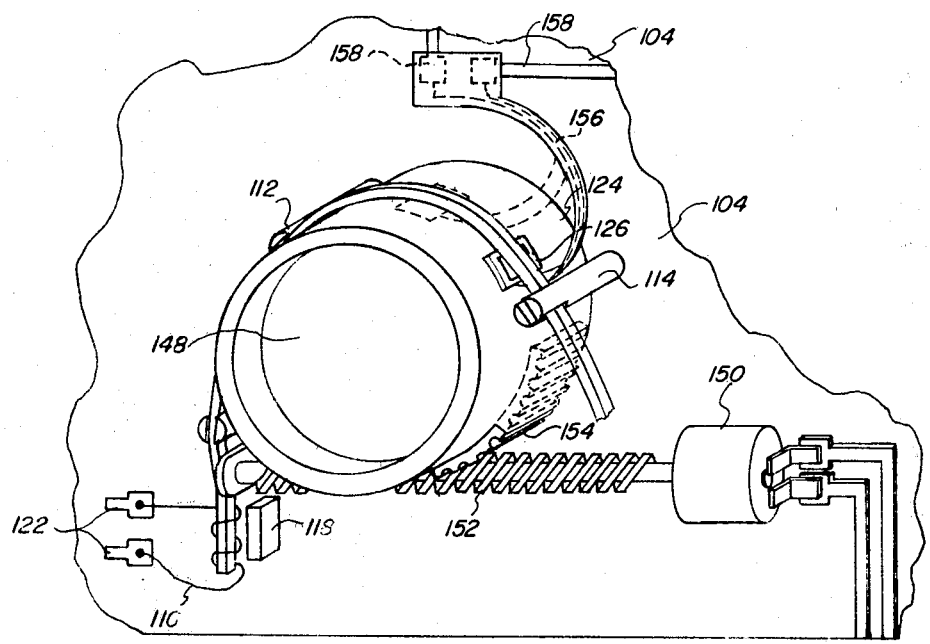
FIG. 3 is a more detailed view of the lens position sensor, shown in FIG. 2.

The position sensors will now be described in more detail with reference to FIGS. 3–6. Turning first to FIG. 3, the focus position sensor will be described. Lens barrel 124 carrying a movable lens element 148 is mounted for focusing movement with respect to mechanism plate 104 (partially shown). Focus drive motor 150 mounted on mechanism plate 104, drives the lens barrel 124 through a worm gear drive comprising worm gear 152 and a rack 154 molded on lens barrel 124. Focus motor 150 is driven in one direction to cause movable lens 148 to focus on near objects and in the opposite direction to cause lens 148 to focus on distant objects. A lens position sensor coil 126 is attached to lens barrel 124. The sensor coil 126 may be fabricated directly on the lens barrel 124 or on a suitable film substrate using well-known photofabrication techniques and fastened to the lens barrel 124 for example, by adhesive. A flexible lens 156, comprising for example an extension of the sensor coil, connects the sensor coil to a printed conductor pattern 158 on the mechanism plate 104. As lens barrel 124 is turned by focus motor 150 to focus lens element 148, sensor coil 126 is displaced along magnetostrictive wire 112 as shown by dotted lines in FIG. 3.

Figure 4:
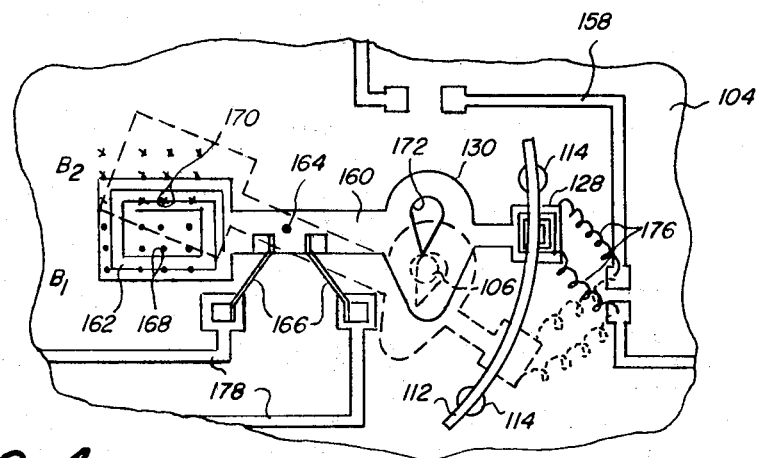
FIG. 4 is a more detailed view of the aperture/shutter position sensor, shown in FIG. 2.

The next position sensor to occur along the magnetostrictive wire 112 is the aperture shutter sensor shown in more detail in FIG. 4. The electromagnetic shutter shown in FIG. 4 is described in more detail in U.S. patent application Ser. No. 219,168 entitled "Method of Controlling Electromagnetic Actuator in a Camera, and Actuator Controllable Thereby" filed Dec. 22, 1980 in the name of J. K. Lee and assigned to the assignee of the present application. The aperture shutter includes an armature 160 formed from a sheet of opaque insulating material and having a planar coil 162 formed on the armature by photofabrication techniques. The armature is mounted for pivotal movement about a point 164 by a flexure hinge 166. Flexure hinge 166 comprises two legs of springy conductive material providing the electrical contact to coil 162. Coil 162 defines first and second legs 168 and 170 generally perpendicular to the direction of movement of the coil about pivot point 164. Oppositely directed magnetic fields $B_1$ and $B_2$ are generated by a pancake magnet 172 (shown in FIG. 2) suspended over the coil. Leg 168 of coil 162 resides in field $B_1$ and leg 170 resides in field $B_2$.

Armature 160 defines an aperture blade 130 forming a tapered aperture 172 for progressively uncovering the fixed aperture 106 in the mechanism plate 104. Sensor coil 128 is formed on an extension of aperture blade 130 and connected by flexible leads 176 to printed conductor 158. Coil 162 is connected to control electronics 120 by printed leads 178. When current is applied to coil 162 by the control electronics, the electromagnetic forces generated on legs 168 and 170 cause armature 160 to pivot about point 164 (as shown in phantom in FIG. 4) to progressively uncover aperture 106. The extent of uncovering is determined by the amount of current caused to flow through coil 162. As the armature 160 pivots about point 164, sensor coil 128 sweeps along magnetostrictive wire 112 to give a continuous indication of the position of the shutter/aperture.

Figure 5:
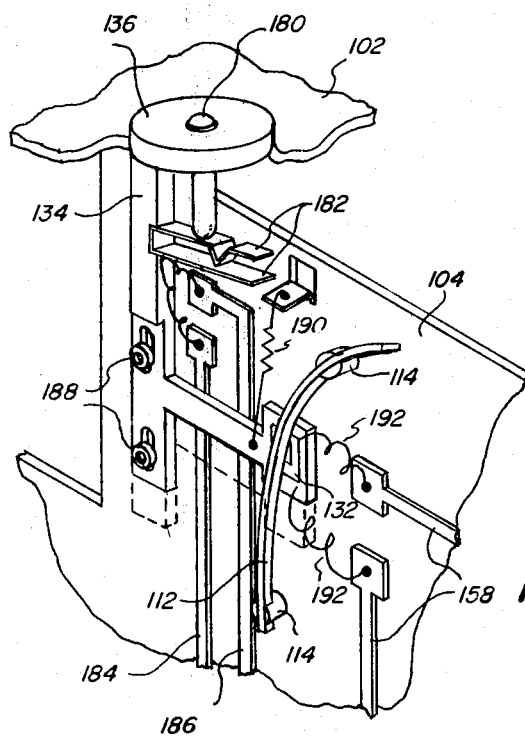
FIG. 5 is a more detailed view of the body release sensor shown in FIG. 2.

From the aperture/shutter position sensor, the magnetostrictive wire 112 continues on to the body release sensor shown in more detail in FIG. 5. A body release member comprises an inner push button 108 and an outer push button 136. A pair of electrical contacts 182 are carried by an extension 134 of outer push button 136, and are adapted to be closed by pressure on inner push button 180 when the operator first applies pressure to the body release member. The contacts are connected to printed conductors 184 and 186 on mechanism plate 104 which are connected to the power supply for control electronics 120 (shown in FIG. 2). Closure of contacts 182 supplies power to the camera control electronics 120 to initiate the preliminary phase of a photographic cycle (to be described below). Button 136 of the body release member is mounted on the mechanism plate 104 by pin-and-slot connections 188 and is biased toward the position shown in solid lines in FIG. 5 by a spring 190. Sensing coil 132 is carried by extension 134 on button 136. Continued pressure on the body release member by the camera operator. causes button 136 and extension 134 to move downwardly against the force of spring 190, causing sensing coil 132 to be displaced along the magnetostrictive wire 112, as shown in phantom in FIG. 5. Sensing coil 132 is connected by flexible conductors 192 to printed conductor 158.

Figure 6:
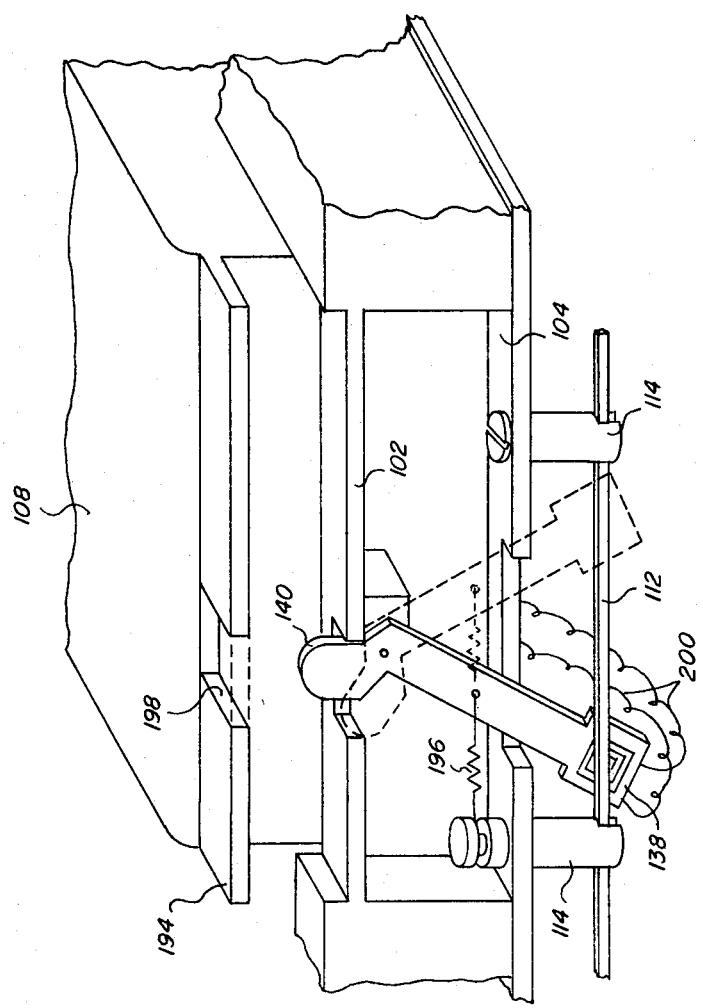
FIG. 6 is a more detailed view of the cartridge notch sensor shown in FIG. 2.

Continuing along magnetostrictive wire 112, the last sensor to be encountered is the film cartridge notch sensor shown in more detail in FIG. 6. The notch sensor includes a pivotally mounted sensing lever 140 which protrudes through an opening in the mechanism plate 104 and an opening in a portion of the camera body 102 to engage a flange 194 on a cartridge 108 inserted into the camera. Sensing lever 140 is normally biased toward its protruding position as shown in solid lines in FIG. 6 by a spring 196. When a cartridge having a notch 198 in flange 194 is inserted into the camera, the position of sensing lever 140 is unaffected. However, when notch 198 is not present in the cartridge flange, sensing lever 140 is caused to pivot to the position shown in phantom in FIG. 6, thereby displacing sensor coil 138 along magnetostrictive wire 112. In this way, encoded information regarding the film in the cartridge 108, for example the ASA speed of the film, film type, or number of exposures, is entered into the digital processing circuitry of the camera.

Sensor coil 138 is carried on the distal end of sensing lever 140 and is connected to the printed conductor 158 (not shown in FIG. 6) on mechanism plate 104 by flexible leads 200.

The speed of sound in the magnetostrictive wire 112 is about 5000 meters/second. Therefore, an acoustic pulse travels 1 mm in about 200 nanoseconds. To measure the position of a sensing coil with respect to the magnetostrictive wire, accurately to within 1 mm, therefore requires that the period of the clock in the timer used to time the propagation of the acoustic pulse from the sending coil to the sensing coil be about 200 nanoseconds, that is a clock frequency of about 5 MHz. This clock frequency falls within the range of clock frequencies employed with presently available microcomputers (e.g., 2–6 MHz). In many applications however, it is desirable to measure positions with greater accuracy. One approach is to employ a separate high frequency clock for the timing circuit that measures the time of propagation of the acoustic pulse. For example, to measure distances with an accuracy of ¼ of a millimeter would require a 20 MHz clock, and for accuracies of 0.1 mm, a 50 MHz clock is required. According to the present invention however, the accuracy of the position sensor may be increased without the need for a higher frequency clock, thereby allowing the clock already available in the microprocessor to be employed. According to this method, an acoustic pulse is launched from the pulse sending transducer, and immediately upon receipt of the pulse by the sensing transducer, a second pulse is launched by the sending transducer. This process is repeated until N pulses have been launched and sensed. The timer, using the clock provided in the microprocessor, measures the total elapsed time from the launch of the first pulse to the receipt of the Nth pulse. The total time is then divided by N, yielding an elapsed time that is accurate to one Nth of a clock period. For example, to measure within ¼ millimeter accuracy with a 5 MHz clock, four consecutive pulses are launched and sensed, and the total elapsed time is divided by four. To measure accurately to within 1/10 of a millimeter, ten consecutive pulses are launched and sensed and the resulting elapsed time is divided by 10.

Thus by determining the number of repetitions, the accuracy of each measurement may be tailored to the accuracy requirements of each sensor in the camera. In cases where a binary type either/or measurement is needed, such as with the notch sensor or the body release button, only one pulse is required. In cases where more accuracy is required, for example the focus position feed-back sensor or the shutter/aperture position sensor, more pulses can be used to produce the required accuracy.

Connecting all the sensor coils in series as described in the preferred embodiment above, minimizes the number of connections running through the camera, but requires that the timer distinguish in some manner between the signals produced by the various sensors. This is accomplished according to the presently preferred embodiment by enabling the receipt of a signal from the sensors only within a particular time window characteristic of the sensor selected. The time window is determined by a window timer which is preset with a number corresponding to the opening time of the window. The window timer is started as soon as the pulse is launched, and enables the control electronics to receive a signal from the sensors when the preset time has expired. The time window represents the relative location of the selected sensor coil along the magnetostrictive wire with respect to the other sensor coils and is designed to open just prior to the earliest possible time of receipt of a signal from the selected sensor. The preset time window for each sensor can be viewed as the address of the sensor.

Figure 7:
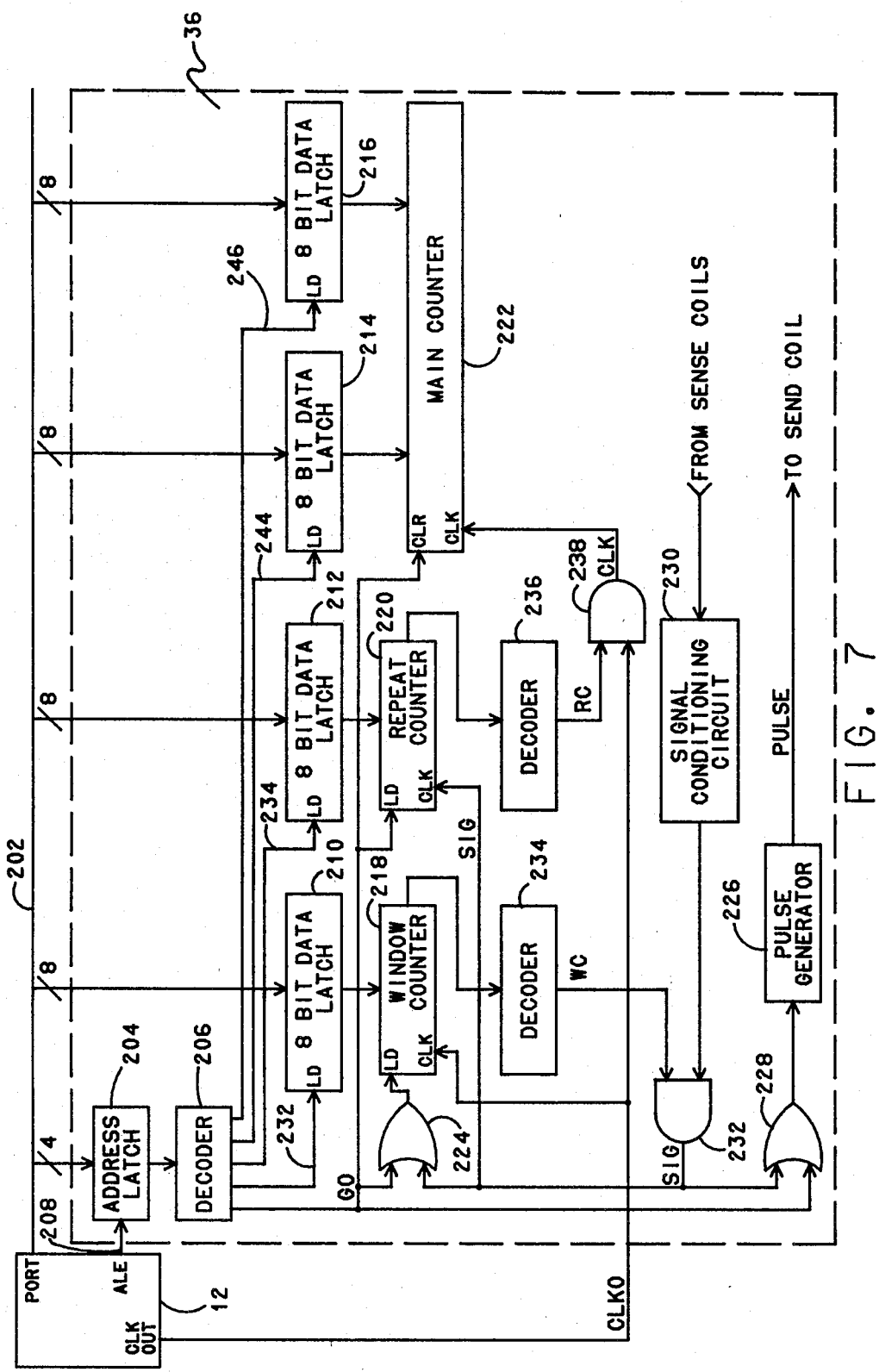
FIG. 7 is a block diagram of the position sensor interface and control electronics shown in FIG. 1.

A presently preferred embodiment of the position sensor interface and control electronics will now be described in more detail with reference to FIG. 7. The interface and control electronics 36 communicate with and receive information from a microprocessor 12 on an eight-bit bus 202. Communication with the control electronics 36 is controlled by a four-bit address latch 204 and decoder 206. The address latch 204 is enabled by a signal supplied from the microprocessor on an address latch enable line 208 and is capable of selectively addressing through decoder 206, four eight-bit data latches 210, 212, 214, and 216. Control electronics 36 includes an eight-bit window counter 218 that is loaded through data latch 210 with a window count for the desired sensor. An eight-bit repeat counter 220 loaded through data latch 212 determines the number (N) of pulses to be sent by the sensor, thereby setting the accuracy of the sensor measurement A sixteen-bit main counter 222 measures the total elapsed time from the launch of the first pulse to the receipt of the Nth pulse. The final count is stored on a pair of eight-bit data latches 214 and 216 for transmittal to the microcomputer on bus 202.

The microcomputer 12 can also address decoder 206 to supply a "GO" signal that commands the execution of a sensor operation after the window and repeat counters have been initialized. The "GO" signal is supplied to a "load" (LD) input of the window counter 218 through an OR gate 224. The "GO" signal is also supplied to the load "load" (LD) input of the repeat counter 220 and to a "clear" (CLR) input of the main counter 222. The "GO" signal is also supplied to a pulse generator circuit 226 through an OR gate 228. Pulse generator circuit 226 applies the electrical pulse to the sender coil of the magnetostrictive position sensor to launch an acoustic pulse in the magnetostrictive element.

The sense coils of the magnetostrictive position sensor are connected in series to a signal conditioning circuit 230 which amplifies and shapes the detected pulses from the sense coils and applies them to an AND gate 232. AND gate 232 is enabled by the window counter 218 via a signal (WC), to allow a detected pulse to pass only when the window is open. The WC signal is generated by a decoder 234 from the output of the window counter 218.

The output of AND gate 232 (called SIG), is applied to the load input of window counter 218 through OR gate 224; to the "clock" (CLK) input of repeat counter 220; and to pulse generator circuit 226 through OR gate 228.

The output of repeat counter 220 is applied to a decoder 236 to produce a signal (RC) that disables an AND gate 238 when the desired number N of acoustic pulses have been launched and sensed in the magnetostrictive element. A clock signal (CLKO) from microcomputer 12 is applied to an input of AND gate 238 to produce a clock signal (CLK) that is applied to the "clock" (CLK) input of maincounter 222.

The operation of the position sensor interface and control electronics will now be described with reference to FIGS. 7 and 8. To initialize the position sensor interface and control electronics, the microcomputer applies the address of data latch 210 to the bus 202 and sends an address latch enable signal to the address latch 204, causing the decoder to apply a "load" signal on line 232 connected to the load input (LD) of data latch 210. An eight-bit data word representing the sensor window count is then applied to bus 202, causing the window count to be captured and held in data latch 210. Similarly, the microcomputer addresses data latch 212 through the address latch 204 and decoder 206 to apply a load signal to line 234 connected to the load input of data latch 212 and stores the repeat count N in data latch 212. The position sensor is now prepared to measure the position of one of the sensing coils to the desired accuracy.

To affect a measurement, the microcomputer sends the "GO" signal via address latch 204 and decoder 206. The "GO" signal (shown in FIG. 8) loads the window counter 218 from data latch 210, loads the repeat counter 220 from data latch 212, clears the main counter 222, and causes the pulse generator 226 to emit a pulse.

As soon as the window counter is loaded, the window counter signal WC goes "OFF" thereby preventing a signal from being detected until the window opens. The repeat counter signal RC goes "ON" thereby supplying the main counter with clock pulses CLK until the repeat counter counts N detected pulse signals.

Figure 8:
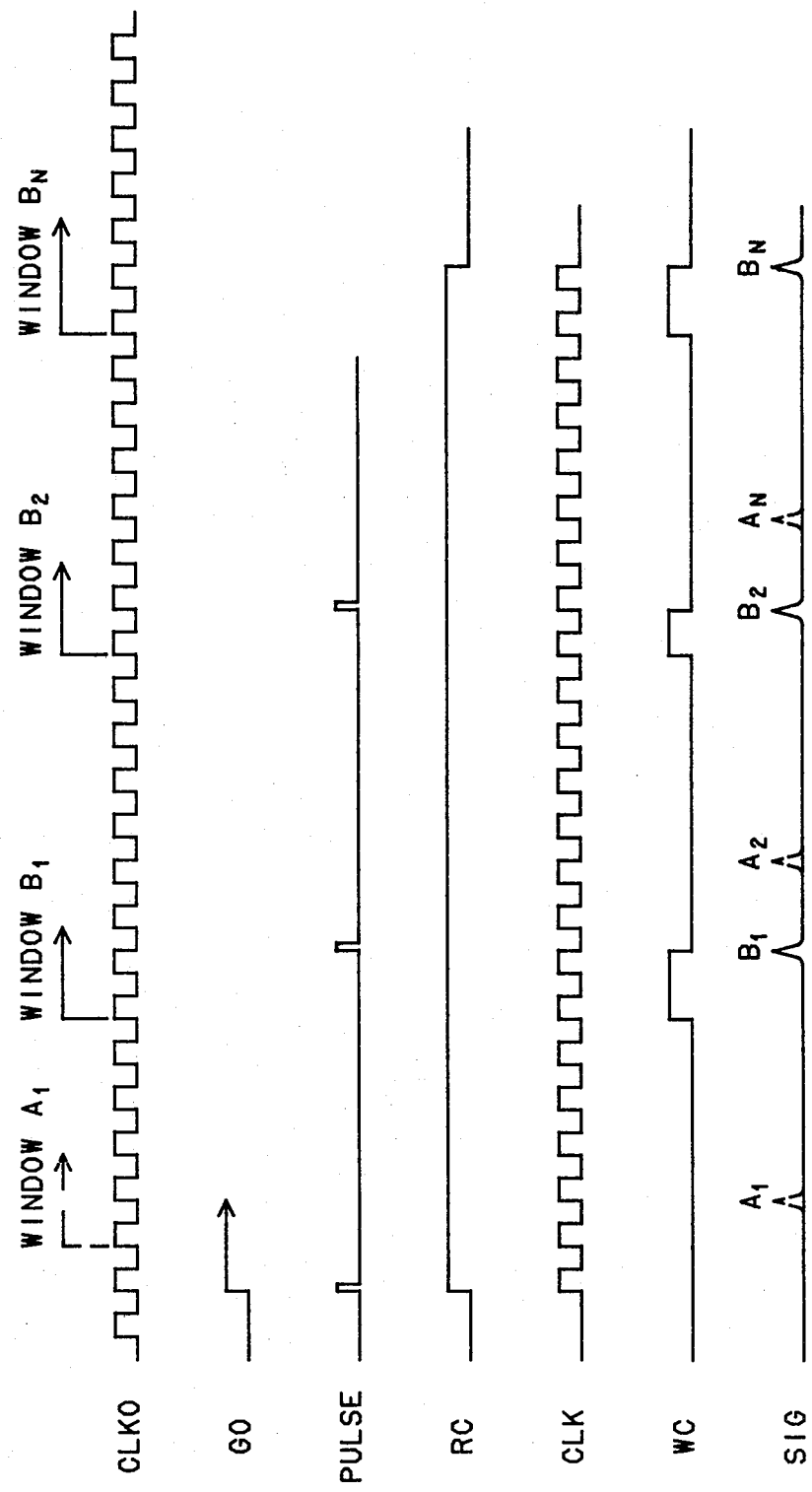
FIG. 8 is a timing diagram useful for explaining the operation of the position sensor interface and control electronics of FIG. 7.

FIG. 8 shows the location of two windows with respect to the clock signal, window A and window B. Window A, shown in phantom, is not opened, therefore when the signal from sensor A is received, WC is "OFF" and no SIG is generated. The count for window B was loaded in the window counter and at the appropriate time, window B opens. Sometime thereafter, the first signal from sensor B is received. A signal (SIG. $B_1$) is generated which increments the repeat counter 220, reloads the window counter 218 (causing WC to go "OFF"), and causes the pulse generator 226 to launch another pulse.

The above sequence is repeated until the Nth pulse is detected, at which point, the repeat counter 220 disables the clock signal CLK supplied to the main counter 222, thereby terminating the count. The count stored in the main counter, at this point, represents the total elapsed time between the launch of the first pulse and receipt of the Nth pulse.

At this time, the microcomputer addresses data latch 214 through address latch 204 and decoder 206 via line 244 to place the eight most significant bits of the main count on the bus 202. The microcomputer reads the eight most significant bits from the bus, and addresses data latch 216 via line 246 to place the eight least significant bits of the main count on the bus. The microcomputer then reads the eight least significant bits. The microcomputer then divides the count by N to get the actual measurement to within 1/N of a clock period.

Figure 9:
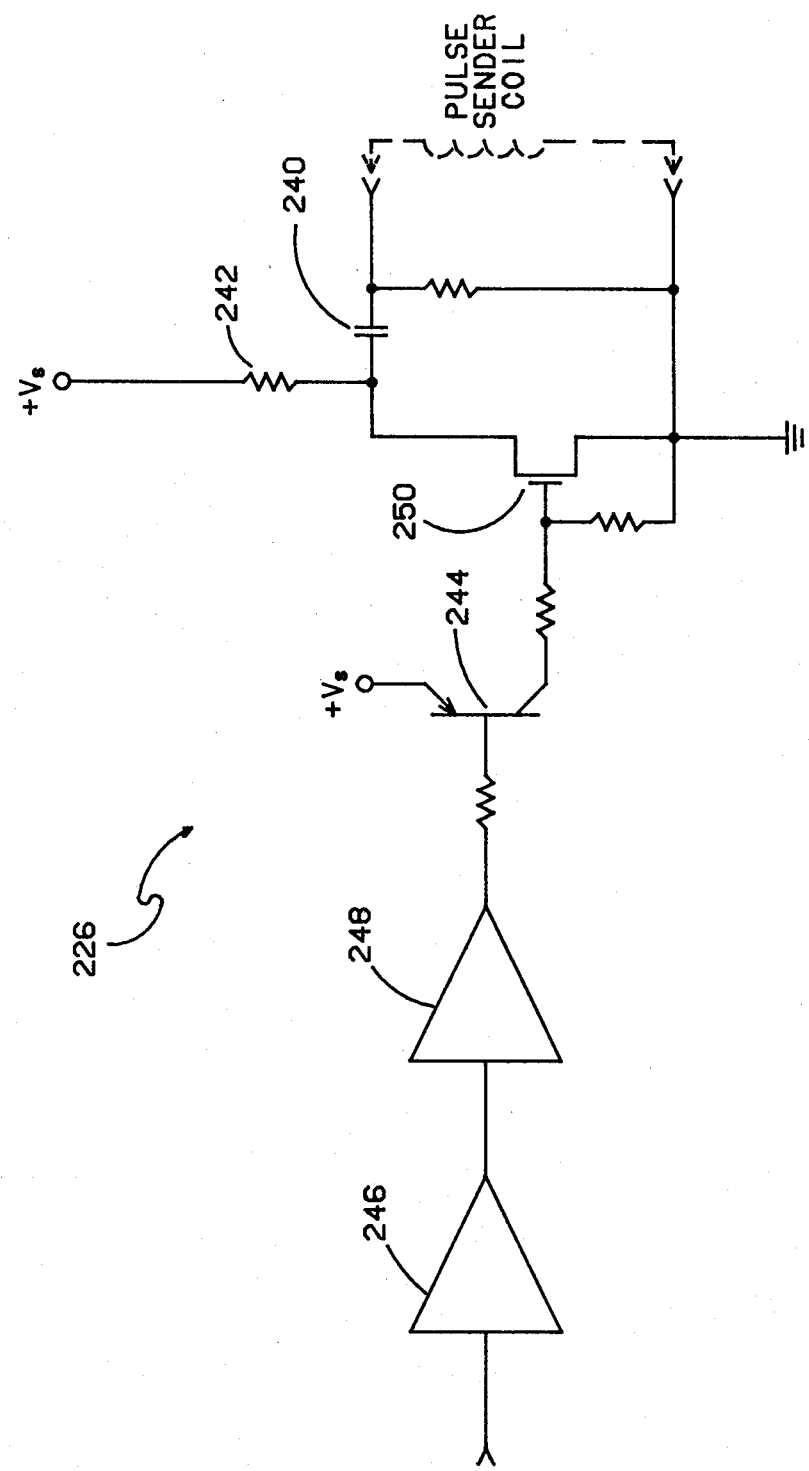
FIG. 9 is a schematic diagram of the pulse generator circuit shown in FIG. 7.

The pulse generator circuit 226 shown in more detail in FIG. 9, comprises a capacitor 240 which is charged through a resistor 242 to a power supply voltage Vs. The pulse generating signal is applied to the base of a drive transistor 244 by drive amplifiers 246 and 248. The drive transistor 244 applies the pulse generating signal to a MOSFET 250 which functions as an electronic switch to quickly short the charged capacitor 240 to ground. This generates a large transient current in the pulse sender coil, creating a strong local magnetic field that induces an acoustic pulse in the magnetostrictive wire. Resistor 242 limits the current drawn from the power supply and is chosen so that capacitor 240 will become fully charged between pulses. Capacitor 240 is chosen large enough so that its discharge will generate an acoustic pulse which is detectable over the noise of the system.

Figure 10:
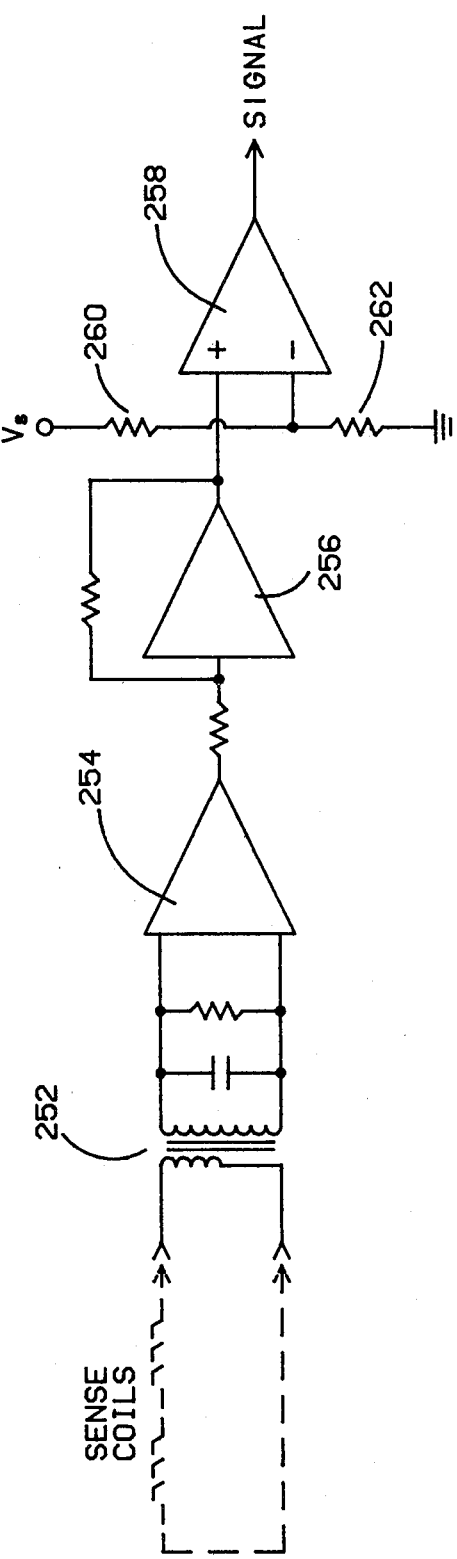
FIG. 10 is a schematic circuit diagram of the signal conditioner circuit shown in FIG. 7.

The signal conditioning circuit 230 shown in more detail in FIG. 10, comprises a transformer 252 and a tuned amplifier 254 used to detect the signal from the sense coils at resonance, while rejecting noise at other frequencies. An amplifier 256 amplifies the detected signal to a level where a comparator 258 is employed to discriminate between a true signal above a threshold voltage, and noise below the threshold voltage. The threshold voltage is determined by a resistor divider network comprising resistor 260 and 262 connected to power supply voltage Vs.

A typical program for operating the camera shown in FIG. 2, will now be explained with reference to FIGS. 11a–b and FIGS. 12 and 13.

Figure 11A:
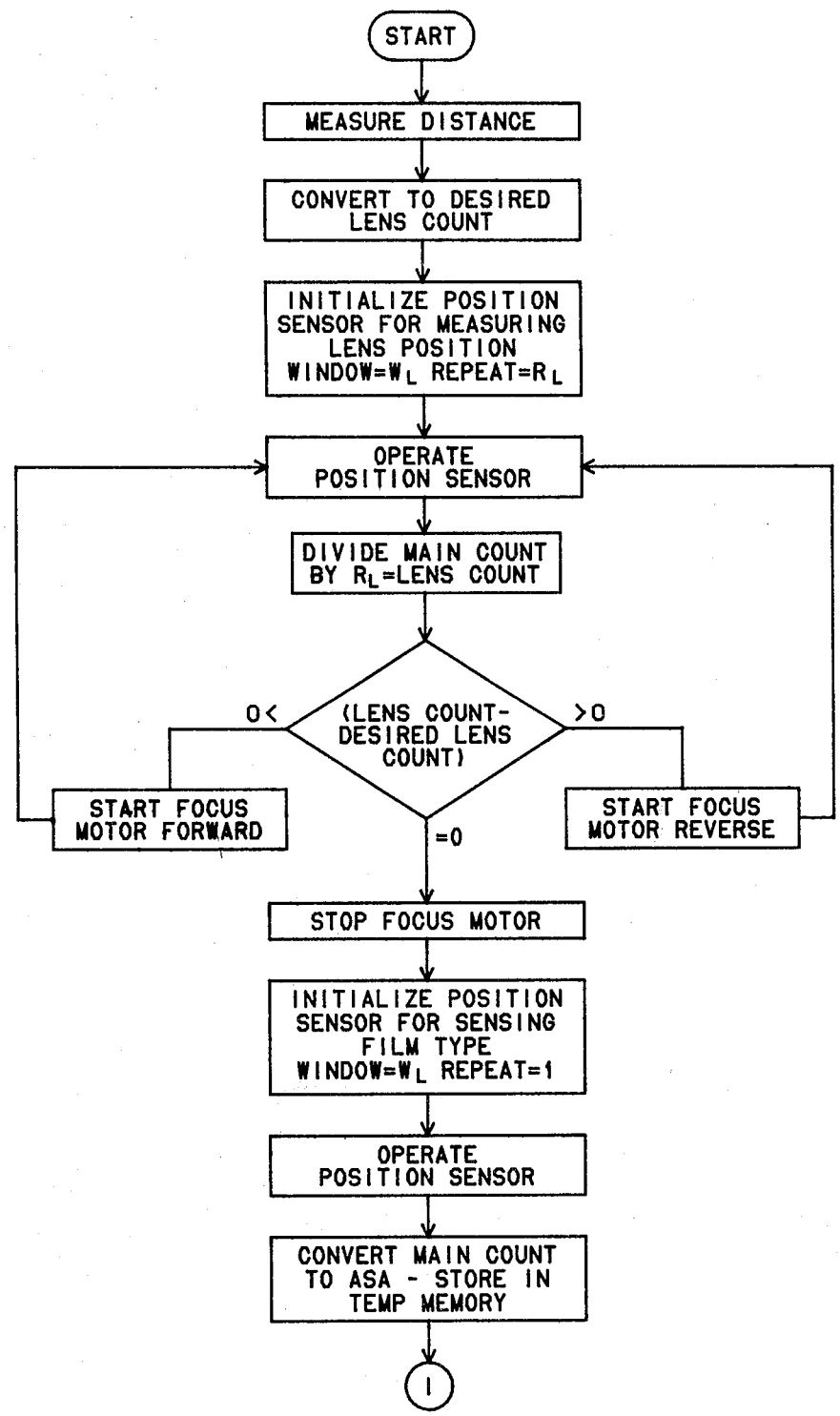
FIG. 11a-b is a flow chart for an exemplary computer program for the digital computer controlled photographic camera shown in FIG. 2.
Figure 11B:
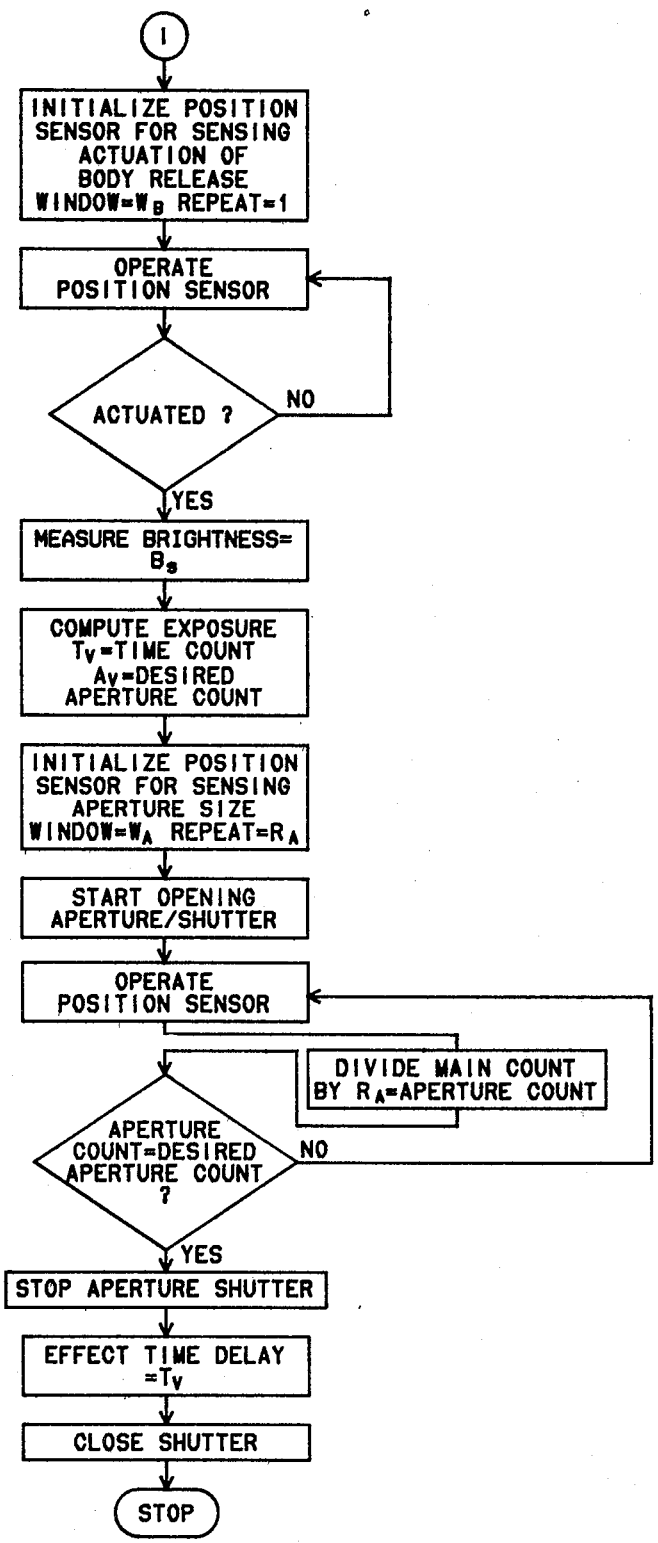

Referring first to FIG. 11a, the computer starts the program when the operator first starts to depress the body release button, thereby closing the main power switch and turning on the microcomputer. The microcomputer immediately sends a signal to the range finder to command the range finder to measure the distance to the subject. The distance measured is converted to a desired lens position represented by a desired lens count for the main counter of the position sensor, and the desired lens count is stored in the temporary memory.

The microcomputer initializes the position sensor for measuring the lens position, by loading the count for the lens position sensor window $W_L$ and the repeat count $R_L$ to determine the accuracy of the lens position measurement into data latches 210 and 212 respectively.

Figure 12:
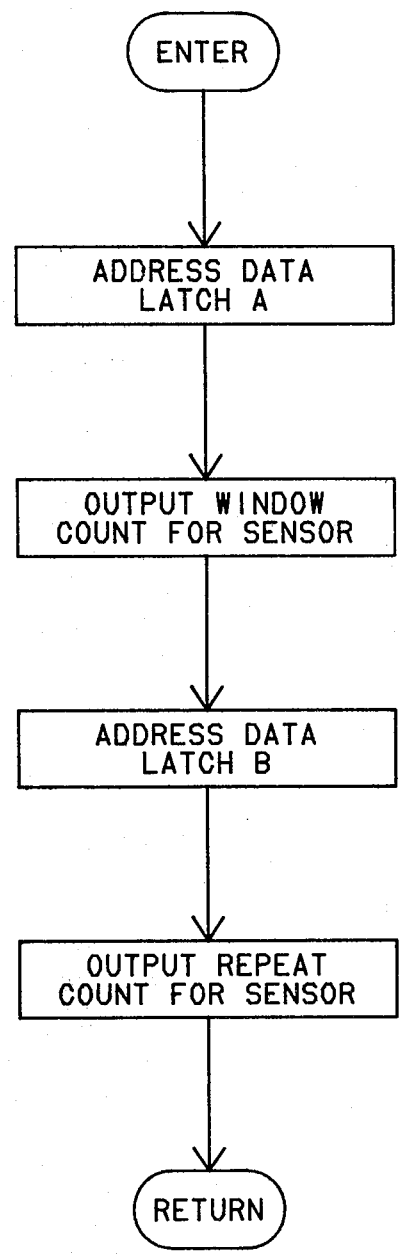
FIG. 12 is a flow chart of the "position sensor initialize" subroutine used in the camera control program shown in FIG. 11a-b.

FIG. 12 is a self explanatory flow chart of the position sensor initialize subroutine that is called each time the sensor is initialized.

Figure 13:
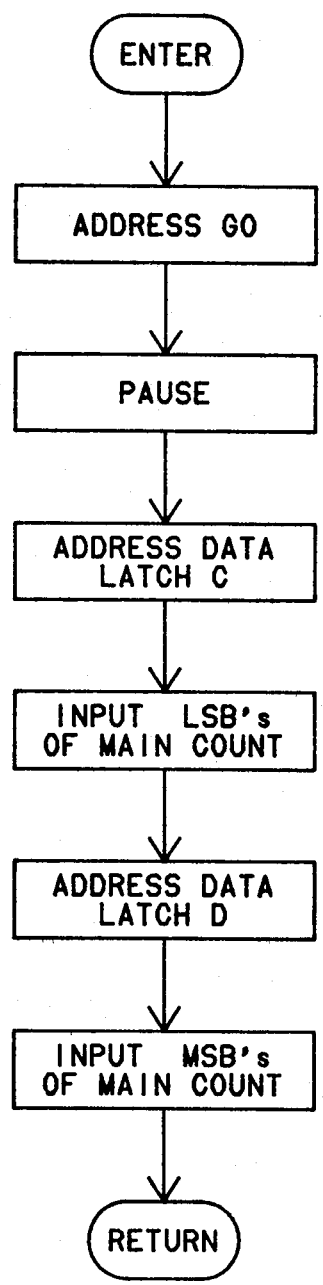
FIG. 13 is a flow chart of the "position sensor operate" subroutine used in the camera control program shown in FIG. 11a-b.

Next, the microcomputer operates the position sensor by sending the "GO" command through the address latch 204 and decoder 206. FIG. 13 is a self-explanatory flow chart of the position sensor operate subroutine that is called each time the position sensor is operated.

The main count returned from the position sensor is divided by the repeat count $R_L$ and the result is compared with the desired lens count subtracting the desired lens count from the measured main count. If the result is less than zero, the microcomputer commands the focus motor to start moving forward. If the result is greater than zero, the focus motor is commanded to move in the reverse direction. When the result equals zero, the focus motor is stopped, and the lens is in proper position for focusing on the main subject. Next, the position sensor is initialized for sensing the film type (ASA speed) by loading the window count $W_F$ and repeat count $R_F$ for the cartridge notch sensor. Since the notch sensor is a binary sensor, the accuracy of the measurement need be no greater than that provided by the computer clock itself, and $R_F$ is set to one (1).

The sensor is then operated and the resulting main count is converted to a number representing the ASA speed of the film in the camera. This number is stored in temporary memory for later use in calculating the exposure parameters.

This completes the first portion of the photographic cycle. If a photographer should choose, at this point, he could remove pressure from the body release member without effecting an exposure and recompose on another subject. Or, the photographer, keeping some pressure on the body return button, could shift the aim of the camera placing the subject at the margin of the picture, and continue with an exposure, thereby having established a proper focus for the subject even though the subject is on the periphery of the scene.

Next, the microprocessor initializes the position sensor for sensing the position of the body release button by loading the window counter with the window count $W_B$ and the repeat count $R_B$ (a one (1) since the measurement is essentially binary and does not need the higher accuracy provided by the multiple precision feature of the control system). The sensor is operated, and the output of the sensor is tested to see if the body release member has been actuated. If no actuation is detected, the microcomputer operates the sensor again and checks, looping in this manner until an actuation is detected.

When an actuation is detected, the microcomputer commands the photometer to measure the brightness of the subject, and uses the brightness and the measured ASA film speed to compute an exposure time and an exposure aperture count (relating to a desired aperture size) according to an exposure control equation stored in the computer. The particular routine for selecting exposure control parameters could be any one of a number of known methods for selecting aperture and shutter values.

The microprocessor initializes the position sensor to measure aperture size, by entering a count $W_A$ representing the aperture window in data latch 210 and a count $R_A$ representing the number of repeats in data latch 212. The microcomputer then commands the shutter to start opening and operates the position sensor. The measured result is divided by the repeat count $R_A$ and compared to the desired aperture count. When the desired aperture count is achieved, the aperture is stopped, and a time delay equal to the desired exposure time is effected. The shutter is then commanded closed, and the program stops.

The invention has been described with reference to a preferred embodiment thereof, however it will be apparent that changes and modifications can be effected within the spirit and scope of the claims.

For example, although a position sensing device with four sensors has been described, it is apparent that other than four sensors could be employed, and although the device was described in combination with a photographic apparatus, certain novel features of the position sensing device such as the use of multiple sensors with a single magnetostrictive element, and the technique of obtaining multiple precision are not limited to use in photographic apparatus and could be employed to beneficial effect in any computer controlled apparatus requiring position sensors.

Although the multiple sensors were described as connected in series, each sensing coil could be associated with its own timer, or the sensing coils could be multiplexed to a single timer by a multiplex switch. Furthermore, the pulse generating coils could be the relatively movable transducers, and a sensing coil the relatively fixed transducer. Some alternative arrangements which are contemplated to be within the scope of the invention, are depicted schematically in FIGS. 14–22.

Figure 14:
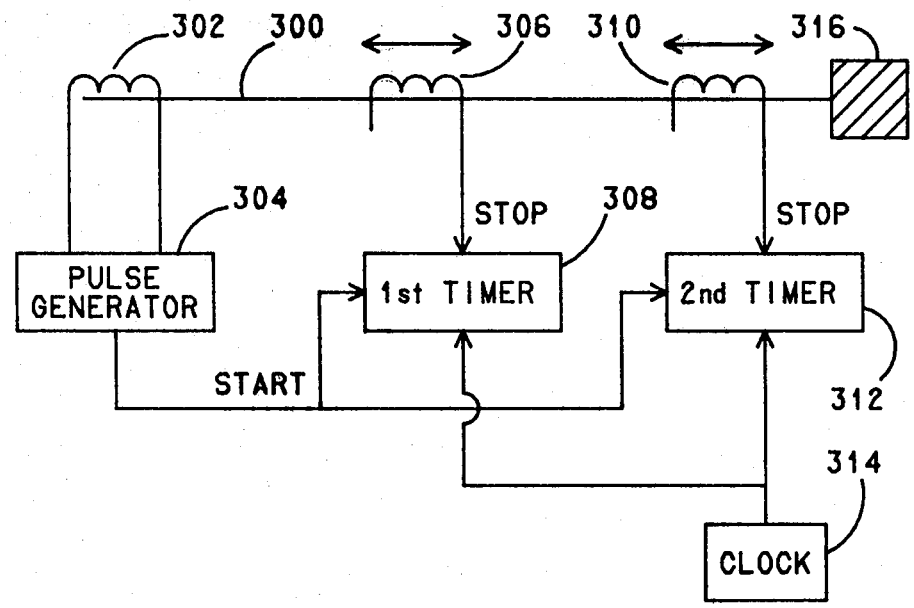
FIGS. 14-22 are alternative embodiments of a magnetostrictive position sensing device according to the present invention, having a plurality of sensors with one magnetostrictive element.

FIG. 14 shows a magnetrostrictive multiple position sensing device comprising a magnetostrictive wire 300, a relatively fixed pulse sending coil 302 connected to a pulse generator 304; a first movable sensing coil 306 connected to a first timer 308; a second movable sensing coil 310 connected to a second timer 312, and a clock 314 for supplying clock signals to the timer circuits. An acoustic damper 316 is shown on one end of the magnetostrictive wire. When an acoustic pulse is launched by pulse generator 304 and pulse sending coil 302, both timers are started. Each timer is stopped independently by a pulse arriving at its associated sensing coil, thus allowing two position measurements to be performed in one operation, at the expense of an extra timer circuit.

Figure 15:
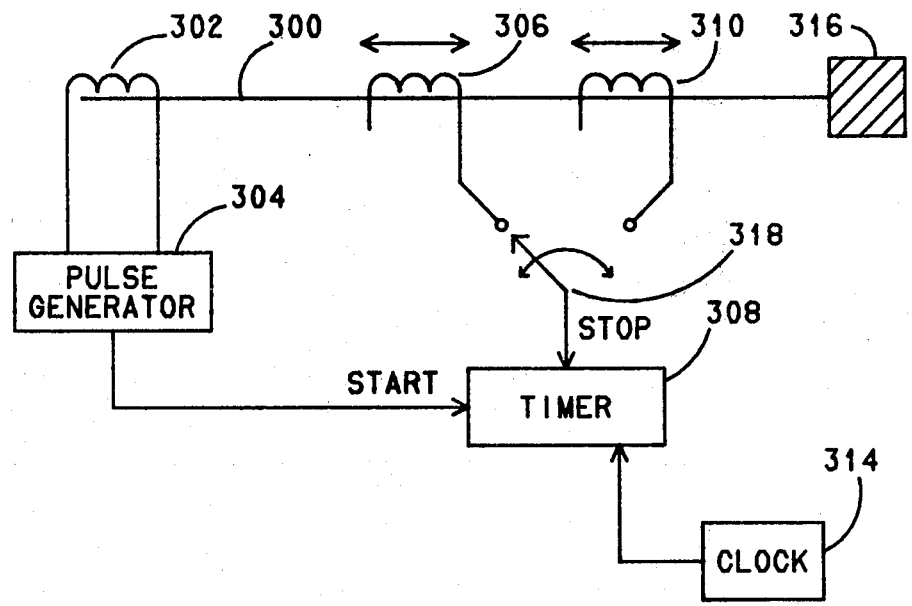

FIG. 15 shows an alternative arrangement with a single timer 308 and a multiplex switch 318 for selectively connecting the movable sensing coils 306 and 310 to the timer 308.

Figure 16:
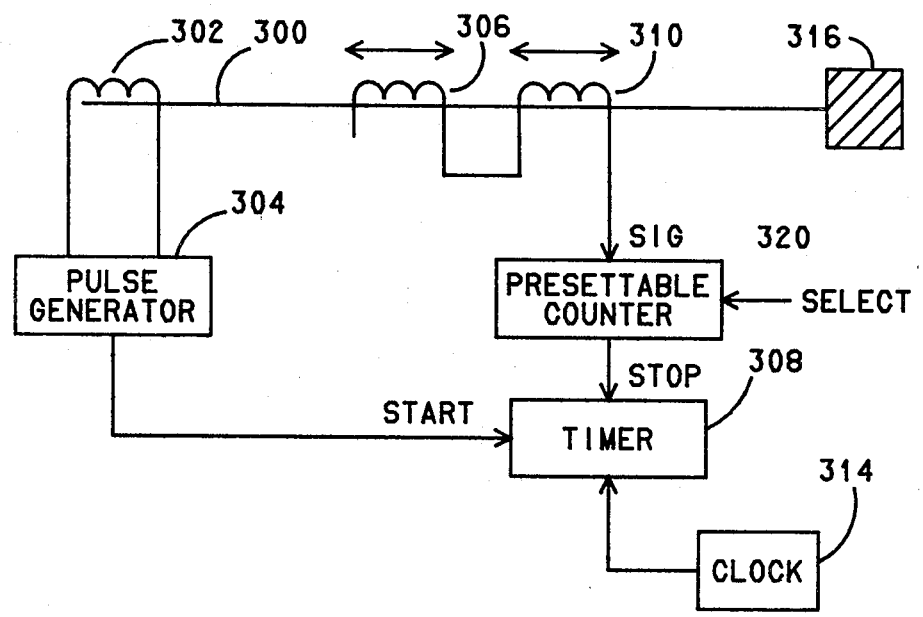

FIG. 16 shows a multiple position sensing device having sensing coils 306 and 310 connected in series to a presettable counter 320. The output of the presettable counter 320 is connected to the stop input of timer 308. Presettable counter 320 can be set to produce an output on either the first received pulse or the second received pulse from the movable position sensors, thereby distinguishing between the position sensors 306 and 310.

Figure 17:
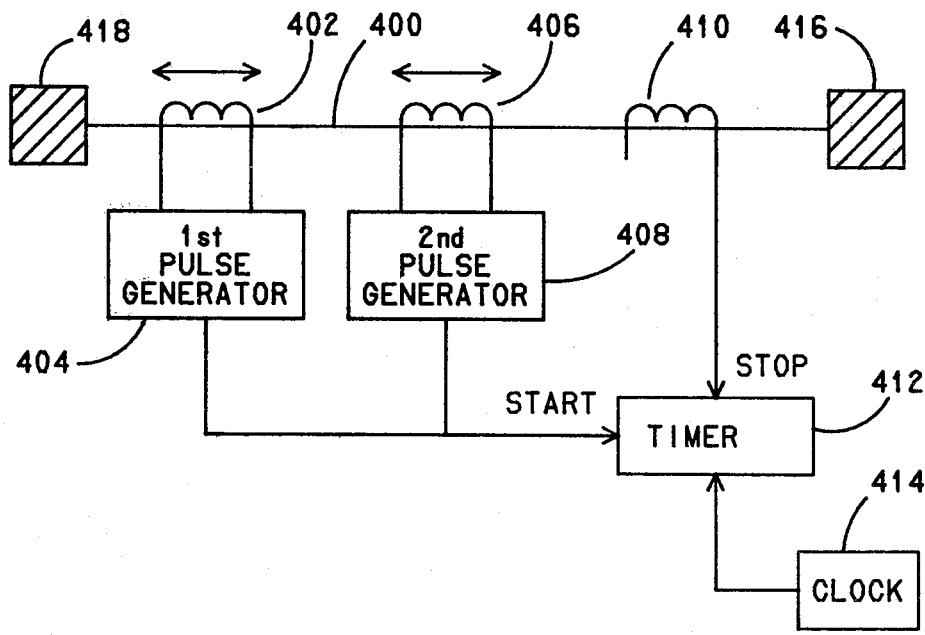

FIG. 17 illustrates an embodiment of a magnetostrictive multiple position sensing device wherein the pulse sending coils are movable, and a sensing coil is relatively fixed. The position sensing device comprises a magnetostrictive element such as a wire 400, a first movable sending coil 402 connected to a first pulse generator 404; a second movable sending coil 406 connected to a second pulse generator 408; a relatively fixed sensing coil 410 connected to a timer 412; a clock 414 for supplying clock signals to timer 412, and a pair of acoustic dampers 416 and 418 connected to the ends of the magnetostrictive element. Upon actuation of either the first or second pulse generator, the timer 412 is started. The timer is stopped when sensing coil 410 senses the pulse.

Figure 18:
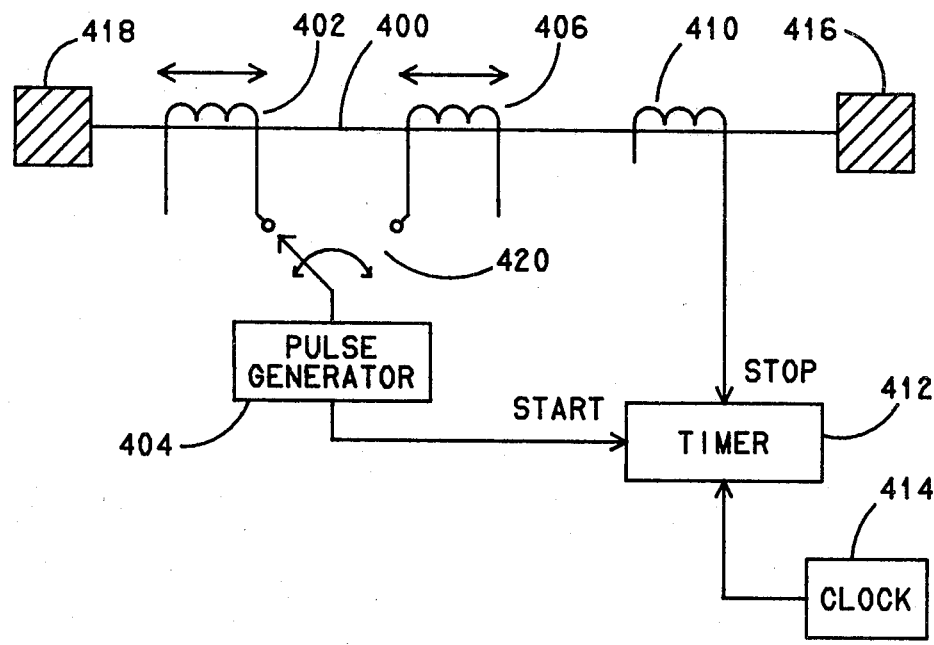

FIG. 18 illustrates an embodiment similar to FIG. 17 with the difference that a single pulse generator 404 is employed and a multiplex switch 420 is employed to select which movable pulse generating coil 402 or 406 is actuated.

Figure 19:
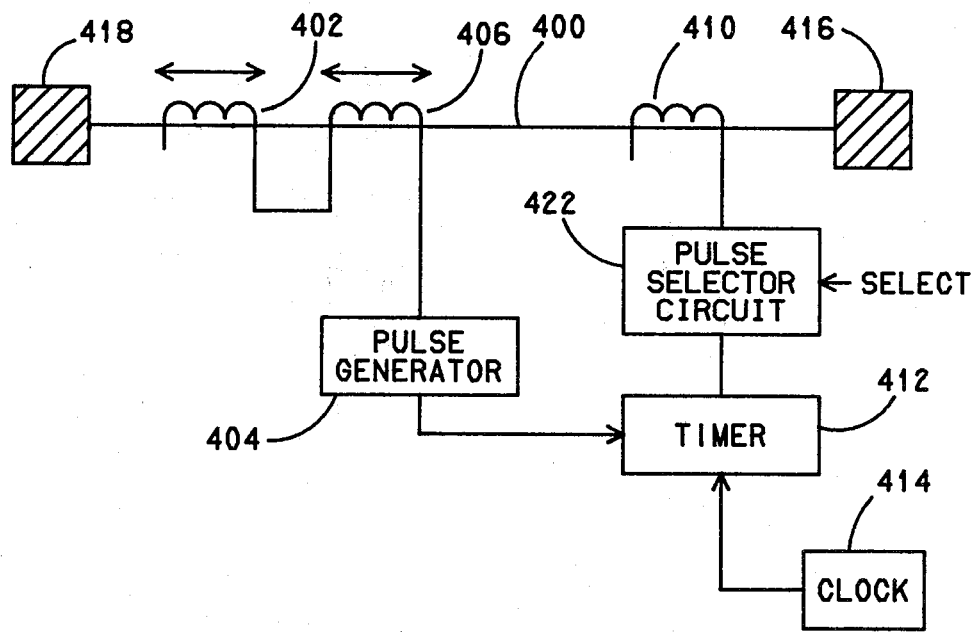

FIG. 19 illustrates an embodiment wherein a single pulse generator 404 is connected in series with movable sending coils 402 and 406. A pulse selector circuit 422 connected between sensing coil 410 and timer 412 comprising either a window circuit or counter circuit as described above, selectively distinguishes between pulses received from either the first or second sender coil.

Figure 20:
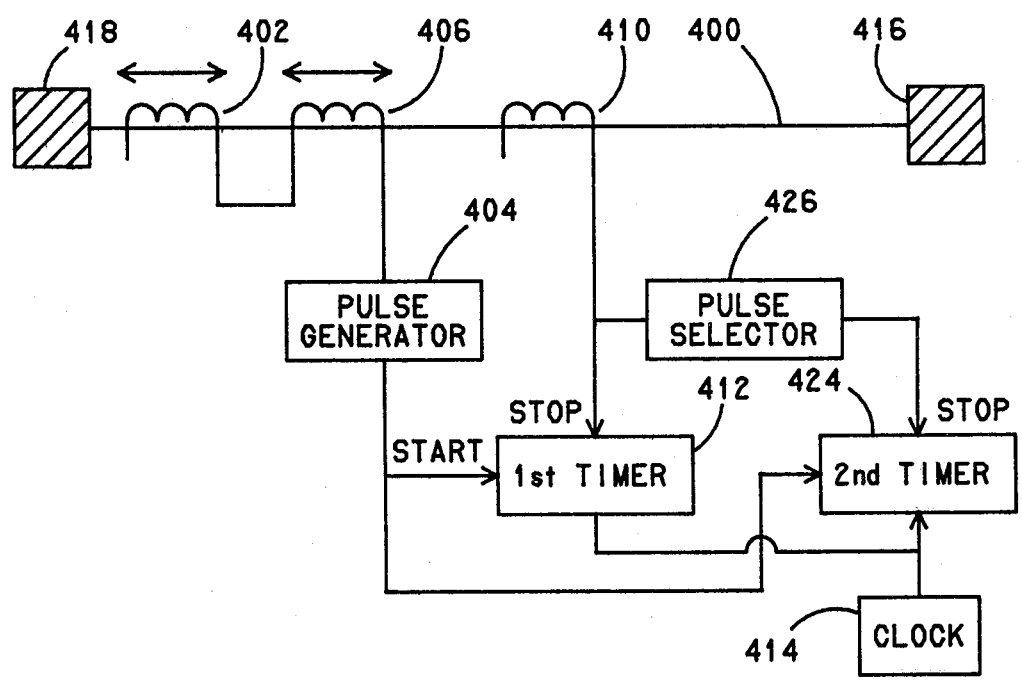

FIG. 20 shows an embodiment similar to FIG. 19, wherein a second timer circuit 424 and a pulse selector circuit 426 are connected to sensing coil 410 so that the position of both sending coils may be measured in one operation.

Figure 21:
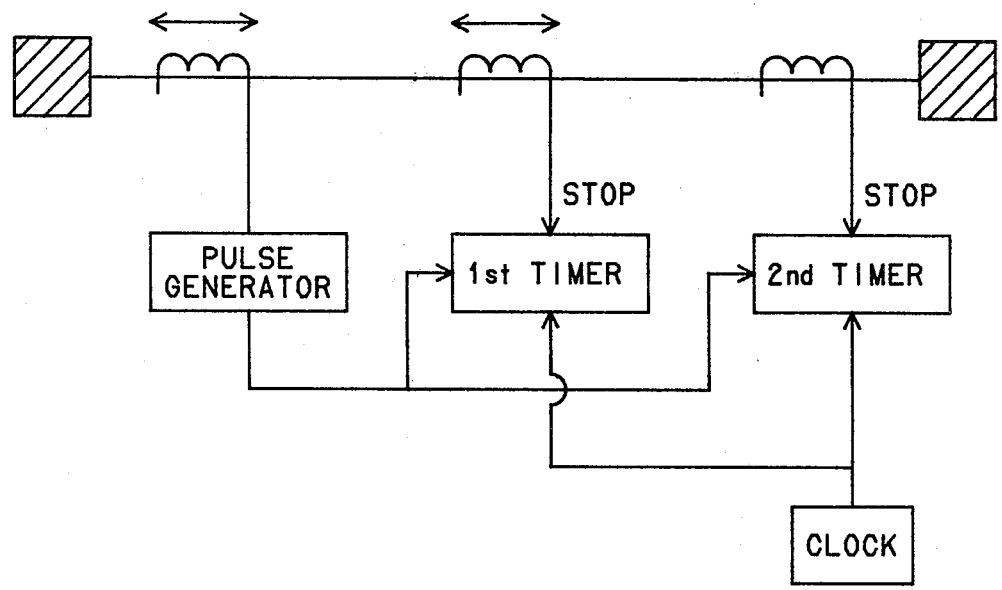

FIG. 21 shows a position sensing device similar to that shown in FIG. 14 except that the sender coil and only one of the sensor coils are movable, the other sensor coil being relatively fixed. This configuration allows the direct measurement of the distance between the movable transducers and between one of the movable tranducers and the fixed transducer.

Figure 22:
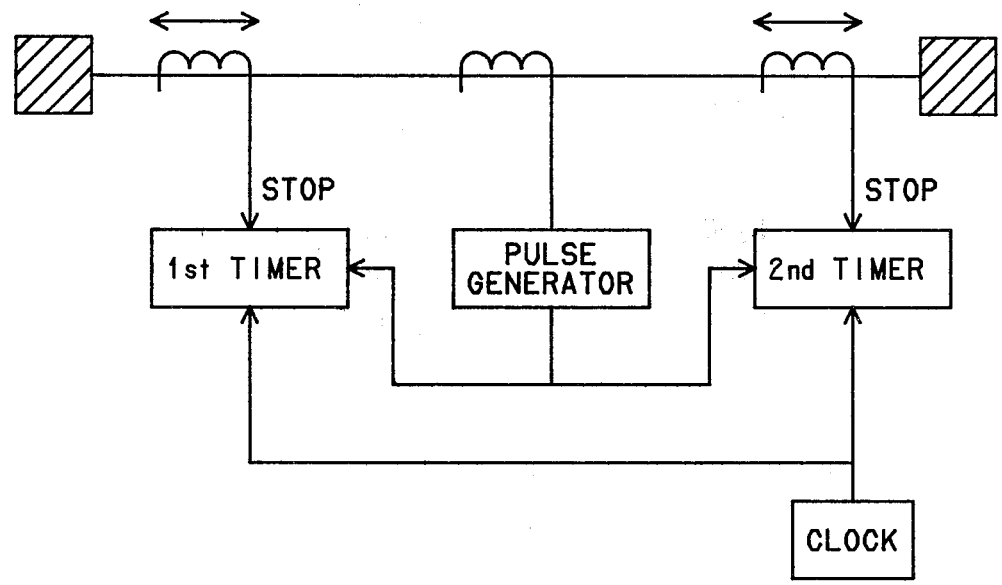

FIG. 22 shows a fixed pulse sending coil between two movable pulse sensing coils. Each sensing coil is connected to its own timer.

I claim:
1. A photographic camera, comprising:
a camera body;
a camera member such as a shutter/aperture blade, lens, cartridge notch sensor, or shutter release button mounted for movement with respect to said camera body; and
a position sensing device for sensing the position of said camera member, said position sensing device including:
a magnetostrictive element;
sender means located at a first position with respect to said element for launching an acoustic pulse therein;
sensor means located at a second position displaced along said element from said first position for sensing the acoustic pulse in said element, said sender means and said sensor means being coupled to said camera body and said movable camera member for relative movement along said magnetostrictive element in response to movement of said camera member; and
timer means coupled to said sender means and said sensor means for measuring the elapsed time between the launch and sensing of the acoustic pulse, the elapsed time representing the relative position of said moveable member with respect to the camera body.

2. The invention claimed in claim 1, wherein said magnetostrictive element is a wire, said sender means is fixed relative to the camera and said sensor means is carried by said camera member and is adapted to be displaced along said wire in response to movement of said member.

3. The invention claimed in claim 1, further comprising control circuit means connected to said sender means, said sensor means, and said timer means for causing said sender means to launch a succession of N pulses, each succeeding pulse being launched upon sensing of the preceeding pulse by said sensor means, said timer means measuring the elapsed time between the launching of the first pulse and the sensing of the last pulse, and for dividing the elapsed time measured by said timer means by N to yield a multiple precision position measurement.

4. The invention claimed in claim 2, further comprising second sensor means carried by a second moveable camera member, said second sensor means being moveable independently of said first sensor means disposed at a third location along said wire for sensing the acoustic pulse in said wire, said second sensor means being connected to said timer means for measuring the elapsed time between the launch of a pulse and the sensing of said pulse by said second sensor means.

5. The invention claimed in claim 4, wherein said timer means includes window circuit means for selectively enabling said timer means to respond to either a signal generated by said first sensor means, or a signal generated by said second sensor means.

6. A photographic camera, comprising:
a camera body;
a plurality of moveable camera members, such as a shutter/aperture blade, lens, cartridge notch sensor, or shutter release button, mounted for movement with respect to said camera body; and
a magnetostructive multiple position sensing device for sensing the respective positions of said plurality of moveable camera members, including:
a magnetostrictive element fixed with respect to said camera body;
electromagnetic reference transducer means disposed at a fixed location with respect to said element for transducing an acoustic pulse therein;
first electromagnetic position transducer means, coupled to a first one of said moveable camera members movable with respect to said reference transducer means and said element in response to movement of said first moveable camera member, for transducing said acoustic pulse;
second electromagnetic position transducer means, coupled to a second one of said moveable camera members movable independently of said first position transducer means with respect to said reference transducer means in response to movement of said second moveable camera member, for transducing said acoustic pulse; and
timer means for measuring the propagation times of said acoustic pulse between said reference transducer means and said first and second position transducer means, said measured propagation times being representative of the relative positions of said first and second moveable camera members with respect to said camera body.

7. A photographic camera, comprising:

a camera body;

a camera member such as a shutter/aperture blade, a lens, cartridge notch sensor, or shutter release button, mounted for movement with respect to said camera body; and a magnetostrictive position sensing device for sensing the position of said camera member, said magnetostrictive position sensing device including:

a magnetostrictive element;

electromagnetic input transducer means disposed with respect to said magnetostrictive element for launching an acoustic pulse therein;

electromagnetic output transducer means disposed with respect to said magnetostrictive element, and in spaced relationship with said input transducer means, for sensing said acoustic pulse, said input and output transducer means being coupled to said camera body and said moveable camera member for movement relative to one another in response to movement of said camera member;

control means for causing said input transducer means to launch a first acoustic pulse, and in response to said output transducer means sensing an acoustic pulse for immediately thereupon launching a next acoustic pulse, until N such pulses have been launched;

timer means for measuring the time elapsed between the launching of said first acoustic pulse and the sensing of said Nth acoustic pulse, said timer means including a periodic clock and a counter for counting periods of said clock, said time measurement being represented as an integral number of clock periods, a clock period representing a unit of distance between said output and said input transducer, means for dividing said time measurement by N, the result representing the distance between said output and said input transducer along said magnetostrictive element accurate to within 1/N units of distance and hence the position of said moveable camera member with corresponding accuracy.

* * * * *